United States Patent [19]

Wiener

[11] Patent Number: 4,765,095

[45] Date of Patent: Aug. 23, 1988

[54] METHOD FOR GRINDING PREGEARED BEVEL GEARS

[76] Inventor: Dieter Wiener, Kaiserstuhlstr. 21a, D-7505 Ettlingen, Fed. Rep. of Germany

[21] Appl. No.: 920,770

[22] Filed: Oct. 20, 1986

Related U.S. Application Data

[63] Continuation of Ser. No. 617,523, Jun. 4, 1984, abandoned.

[30] Foreign Application Priority Data

Jun. 3, 1983 [DE] Fed. Rep. of Germany ....... 3320042

[51] Int. Cl.⁴ .............................................. B24B 19/00
[52] U.S. Cl. ...................................... 51/287; 51/5 D; 51/33 W; 51/35; 51/105 HB
[58] Field of Search .................. 51/5 D, 33 R, 33 W, 51/35, 52 R, 52 H, 56 G, 90, 95.6 H, 105 HB, 105.66, 165.77, 165.87, 287

[56] References Cited

U.S. PATENT DOCUMENTS

| 1,830,952 | 11/1931 | McMullen et al. | 51/33 R |
| 1,855,662 | 4/1932 | Bayley | 51/90 |
| 2,932,923 | 4/1960 | Carlsen | 51/33 W |
| 3,127,709 | 4/1964 | Waguri | 51/287 X |
| 3,213,567 | 10/1965 | King et al. | 51/5 D X |
| 3,553,893 | 1/1971 | Stade | 51/287 X |
| 3,974,595 | 8/1976 | Wolf et al. | 51/52 R X |
| 4,378,660 | 4/1983 | Wiener | 51/287 X |

Primary Examiner—Robert P. Olszewski
Attorney, Agent, or Firm—Antonelli, Terry & Wands

[57] ABSTRACT

A method and device for grinding pregeared bevel gears in which the grinding of both flanks of the tooth gap is performed in a single setting and by a single tool in a hobbing process. The grinding machine is provided with a truing device which is rigidly connected to a stationary part of the machine and in which a truing tool is pivotable relative to a grinding wheel to adjust the engagement of the grinding wheel and gear to be treated. A radial movement is imparted to the grinding tool and a compensating movement in a direction perpendicular to that of the radial movement is also imparted to the grinding tool, whereby the grinding of pregeared bevel gears having any profile is possible.

7 Claims, 6 Drawing Sheets

METHOD FOR GRINDING PREGEARED BEVEL GEARS

This is a continuation of application Ser. No. 617,523 filed June 4, 1984 now abandoned.

BACKGROUND OF THE INVENTION

The present invention relates to a method and machine for grinding pregeared bevel gears.

Grinding machines for grinding beveled gears which have circularly shaped tooth flanks have been known. Such tooth surfaces of beveled gears have been ground with the aid of an elliptical additional movement imparted to the grinding head, as has been disclosed, for example, in German patent publication No. P 29 45 483.9-14. This elliptical additional movement is performed in a very quick operation which is important in mass production.

In other known methods of grinding tool profiles of pregeared bevel gears two flanks of only disc-shaped gears have been ground in one setting of the grinding tool whereas for grinding bevel gears two different working operations have been required, or it has been necessary to employ grinding wheels with coatings for the wheel and the counterwheel unless a special construction of the bevel gear toothing required the grinding of both flanks of each tooth in one setting with a crown grinding wheel. This last method, however, strongly limits the possibilities of grinding of the toothing.

SUMMARY OF THE INVENTION

The aim underlying the present essentially resides in providing a method and grinding machine for grinding pregeared bevel gears in one setting at a right-hand and left-hand flanks by a single grinding tool such as, for example, a grinding wheel.

In accordance with the present invention, a grinding method for pregeared bevel gears by a hobbing motion of a bevel gear and a grinding tool in a grinding apparatus including a truing device is proposed, with the method comprising the steps of grinding a right-hand flank and a left-hand flank of the tooth in one setting by a single grinding tool, changing an adjustment of the grinding apparatus during the grinding step in either a continuous or stepwise manner, imparting an oscillating movement to the grinding tool by a continuous cyclic additional movement between the respective center points of the grinding radii for the left-hand flank and the right-hand flank, imparting a compensating movement to the grinding tool in a direction perpendicular to the oscillating movement, numerically controlling the oscillating movement and the compensating movement in the grinding machine, and controlling a truing step in the same manner as the grinding step.

In accordance with further features of the present invention, a grinding method for gringing pregeared bevel gears in a hobbing motion of the bevel gear is proposed wherein a right-hand flank and left-hand flank are ground in a tooth gap in one setting by a single grinding tool, with an adjustment of the grinding machine being carried out in a continuous or stepwise manner. One flank of the tooth is ground in a forward hobbing motion, then a center point of the grinding radius of the grinding tool is shifted by the grinding apparatus so as to enable a grinding of another flank in the same tooth gap in a rearward hobbing motion by imparting first to the grinding tool a radial movement and then a compensating movement in a direction perpendicular to that of the radial movement, with the compensating movement being a rotational movement of the grinding tool. The radial movement and compensating movement of the grinding machine are numerically controlled and the truing step is controlled in the same manner as the grinding step.

By virtue of the above noted features of the process of the present invention, the right-hand flank and left-hand flank of each of ground teeth of the bevel gear are polished in one setting by one grinding tool in such a fashion by the continuous or stepwise adjustment of the grinding machine. A continuous oscillation is imparted to the grinding tool by a cyclic additional movement such as, for example, a movement along a circular conical profile, with the oscillation of the grinding tool being toward and away from a tooth gap between two central points of a tool radii for the raight-hand flank and the left-hand flank, or in one hobbing direction one flank is ground, then a center point of the grinding radius by the tool is changed and the second flank is ground during a rearward hobbing motion. Thus, two motions are provided, with one motion being a radial displacement of the grinding tool and designated an "e" displacement and a balancing or compensating motion which is perpendicular to the radial displacement of the grinding tool and which can be carried out as a rotational movement of the machine.

Since, in the usual construction of the radii of curvatures and epicycloidal profile shapes are only slightly distinguished from each other, pregeared bevel gears with epicycloidal curvatures can also be ground by the subject matter of the present invention in only one setting of the single grinding tool. A portion of the balancing or compensating movement is then adjusted to the toothing and the grinding tool of the present invention is thinner than a width of the tooth gap.

During the manufacturing of tooth bevel gears in a hobbing process, the workpiece is usually secured to the spindle of the workpiece carrier while the grinding tool is mounted on the hobbing member of a tool carrier. The grinding wheel is applied to the workpiece and a conventional hobbing motion generates the tooth shape. The grinding tool defines the tooth shape in a longitudinal direction of the tooth and cutting motion of the grinding tool causes a removal of material in a conventional manner. An eccentricity between the grinding spindle and the central axis of the machine results in the formation of a desired angle of the tooth. If the above mentioned "e" displacement is imparted to the grinding tool, the eccentricity is adjusted to that displacement in order to produce a combination of the tool radii and the angle of the tooth in the correct manner. The "e" displacement can be varied for the right-hand flank and the left-hand flank of the tooth, whereby the displacements of the carrier from the inner end of the tooth to the outer end of the tooth and in the opposite direction can be made independent from each other. The hobbing movement as well as all secondary movements of the tool grinding wheel are numerically controlled so that a mechanical transmission for coordinating all these motions can be eliminated. By balancing or compensating for producing rotation, a correct tooth gap can also be provided by a numerical control of the machine. If the eccentricity is introduced in the numerical control of the machine, the "e" displacement of the grinding tool can be executed with a high precision and in a very short period of time during the change from the forward hobbing motion to the rearward hobbing motion.

Furthermore, the grinding tool fashioned as a grinding wheel, and with the radial movement of the grinding tool, the grinding wheel may be moved toward the truing device and thereby a radius of the grinding wheel is determined.

By virtue of the "e" displacement, the grinding wheel can be moved toward the truing device, such as, for example, a truing roller so that a radius of the grinding wheel may be determined. Likewise, the grinding wheel can also be moved toward the other side of the truing device for the inner truing.

The truing device may be pivotable and an angle of engagement of the truing device with said grinding tool is adjustable through a pivoting movement of the truing device.

According to the present invention, the grinding wheel includes a cutting front edge having a contour, adjustable by a respective coordination between a depth infeed of the truing device and the radial movement of the grinding wheel. The depth infeed allows for a rearward movement of the grinding wheel from the truing roller whereby the eccentricity can be increased when the grinding wheel is somewhat retreated and then again moved toward the truing tool.

Upon the coordination of the depth infeed and the eccentricity, the front edge of the grinding wheel can correspond to the contour of the front edge of, for example, a diamond truing roller so that a base of the tooth of the bevel gear is obtained.

The pivoting movement and the depth infeed of the truing device may be numerically controlled to ensure a generation of a correct tooth contour.

In accordance with further features of the present invention, a grinding machine for grinding pregeared bevel gears is proposed comprising a stationary machine bed, a workpiece carrier for a bevel gear; a motor driven spindle in said carrier and holding a bevel gear to a ground; a motor driven grinding head having a grinding spindle; a grinding wheel on said grinding spindle; a truing device cooperating with the grinding wheel, with the grinding wheel and the bevel gear being ground executing a hobbing motion with respect to each other to generate a shape of a tooth in the direction of the tooth depth. The grinding wheel defines the shape of the tooth in a longitudinal direction of the tooth and a cutting motion of the grinding wheel results in a metal removal from the pregeared bevel gear being ground. An eccentricity of the grinding spindle to a center of the machine results in a desired angle of the tooth.

Advantageously, according to the present invention, the truing device is connected to a rigid part of the grinding machine and is pivotable relative with respect to the grinding wheel for changing an angle of engagement of said grinding wheel. An individual motor drive is provided for the truing device, and the grinding head is adjustable by a motor in a radial direction to the bevel gear and also in a direction perpendicular to the radial direction over a limited distance.

By virtue of the features of the grinding machine of the present invention, it is possible to grind pregeared epicycloidal gears which to date has not been possible.

The truing tool is mounted above the grinding machine on a special frame, and is rigidly connected to either the machine bed or to another rigid part of the machine, such as a workpiece carrier.

With a grinding machine constructed in accordance with the present invention, it is possible to correct an angle of engagement of the truing tool with the grinding wheel due to the pivoting motion of the truing device. The truing roller is independently driven so that any coordination between the speed of the grinding wheel and that of the truing tool is possible.

Advantageously, the truing device includes a truing roller having a center axis and the grinding wheel may have a peripheral line parallel to the center axis.

According to still further features of the present invention, the grinding machine may further include a workpiece carriage and a tool carriage, with the carrier for the bevel gear being mounted on the workpiece carriage. The grinding head is mounted to the tool carriage, and a profile of the grinding wheel without high cambering is produced by the truing device upon a linear superposition of a depth infeed of the workpiece carriage and a eccentricity adjustment, that is, an "e" displacement of the tool carriage.

Preferably, the truing tool has a center point for a radius for cambering the grinding wheel, and a high cambering of the grinding wheel is produced when a linear coordination of a depth infeed and the adjustment of the tool carriage is provided and then a cambering motion of the truing tool is so overlapped that the center point of the radius executes such a curved motion that the grinding wheel is brought to a desired cambering. The truing tool, as noted above, may be a roller, or an individual diamond or a diamond roller with the straight line flank profile. For example, a curved grinding wheel can be profiled with the aid of a silicon carbide grinding disc. With the aid of the grinding machine of the invention, the truing of Borazon in the grinding machine is possible. If the grinding wheel is to be profiled with the diamond roller or the grinding disc, advantageously the truing device may be pivoted by the pivoting device in accordance with an engagement angle difference between the inner and outer angle of the cutting edge of the grinding wheel. The truing device can be rigidly mounted when, for example, the axis of the truing tool extends parallel to the axis of the grinding wheel and a necessary correction is made via the NC-machine control.

The above and other objects, features, and advantages of the present invention will become more apparent from the following description when taken in connection with the accompanying drawings which show, for the purpose of illustration only, several embodiments in accordance with the present invention.

DETAILED DESCRIPTION

Figure 1:
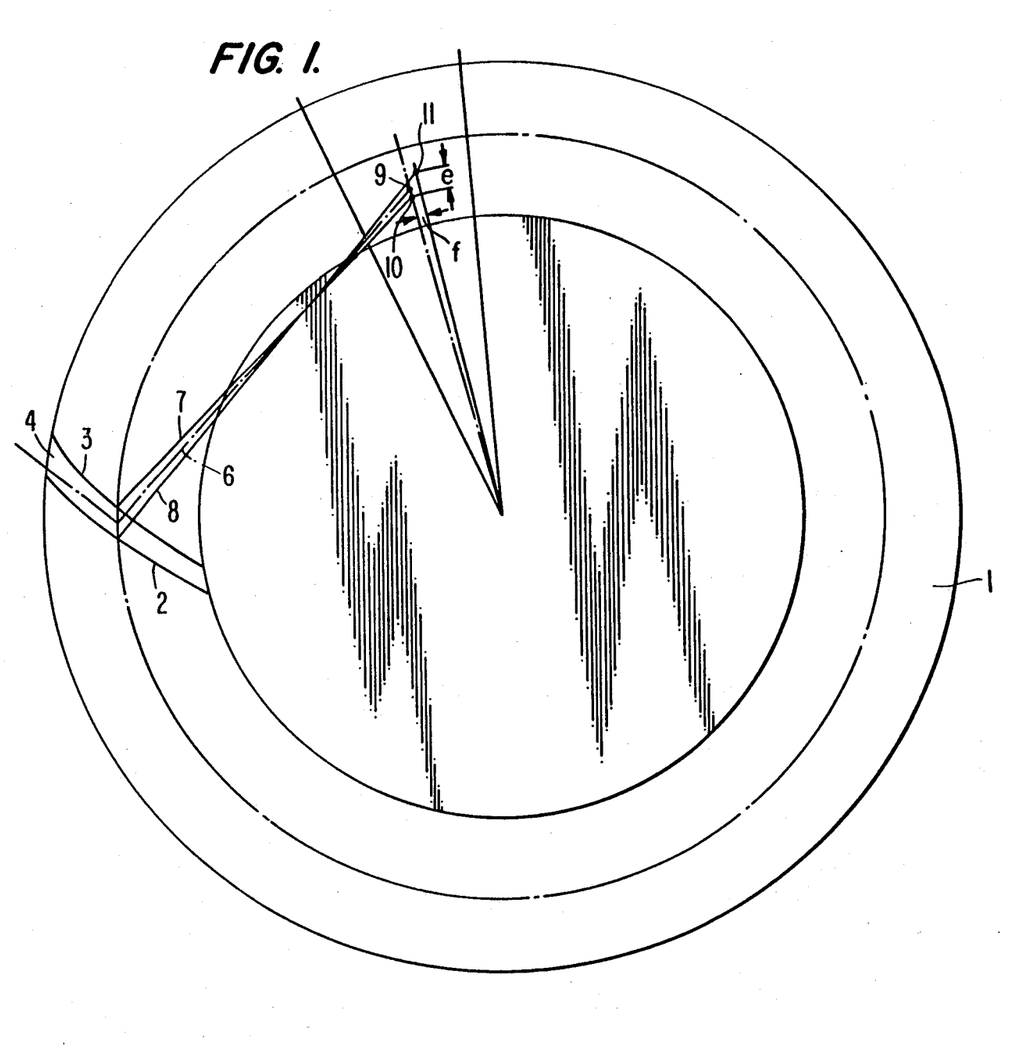
FIG. 1 is a schematic view of a bevel gear in the ideal form of a crown gear according to a geometry of a grinding wheel.
Figure 1A:
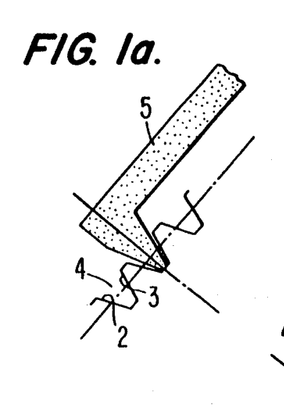
FIG. 1a is a partial cross-sectional view through the toothing of the bevel gear of FIG. 1.

Referring now to the drawings wherein like reference numerals are used throughout the various views to designate like parts and, more particularly, to FIGS. 1 and 1a, according to these figures, a grinding machine of the type disclosed in, for example, Offenlegungsschrifts Nos. 27 21 164 and 29 45 483 is employed for grinding a crown gear having a toothing schematically illustrated by a broken line. A single tooth shown in FIG. 1 has the left-hand tooth flank 2 and the right-hand flank 3, with a tooth gap 4 therebetween. Both tooth flanks 2, 3 are generated by a single tool, namely, a grinding wheel 5 and only in a single setting. The gear or workpiece is pregeared by any known methods.

As also shown in FIG. 1, the surfaces of the tooth flanks 2, 3 are defined by a plurality of radii including a median radius 6 having a center point 9, an inner radius 7 having a center point 10, and an outer radius 8 with a center point 11.

In accordance with a first method of the present invention by which the left-hand and right-hand tooth flanks 2, 3 are to be ground in a single setting, the grinding tool is continuously oscillated and an additional cyclic movement in, for example, the path of a cone 10 and 11 of the inner radius 7 and outer radius 8.

According to a further method of the present invention, a single wheel 5, utilized in a single setting to grind the left-hand and the right-hand tooth flanks 2, 3, first executes a radial movement of the grinding head and the grinding wheel therewith, which is shown by a distance "e" in FIG. 1, and then a balancing or compensating movement "f" in the direction normal to the radial displacement over the distance "e", which balancing or compensating movement "f" can be carried out by a rotational movement of the grinding wheels. A portion of the balancing or compensating rotational movement "f" must be compensated in a direction normal to the toothing of the gear; thus, grinding wheel 5 is thinner than the width of the tooth gap 4. Grinding wheel 5 is shown in FIG. 1a in its median position.

Figure 2:
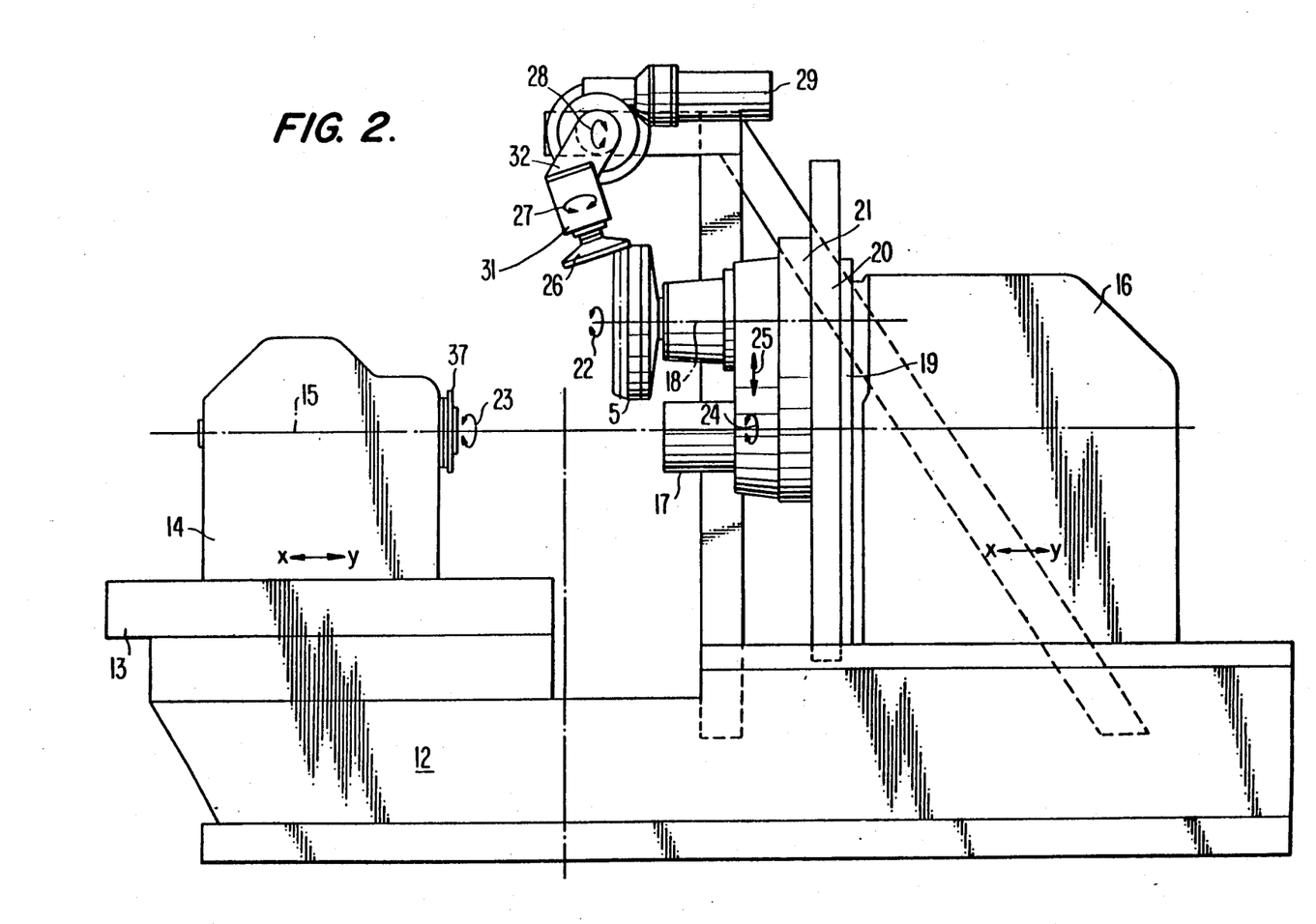
FIG. 2 is a schematic side view of a grinding machine according to the present invention.
Figure 3:
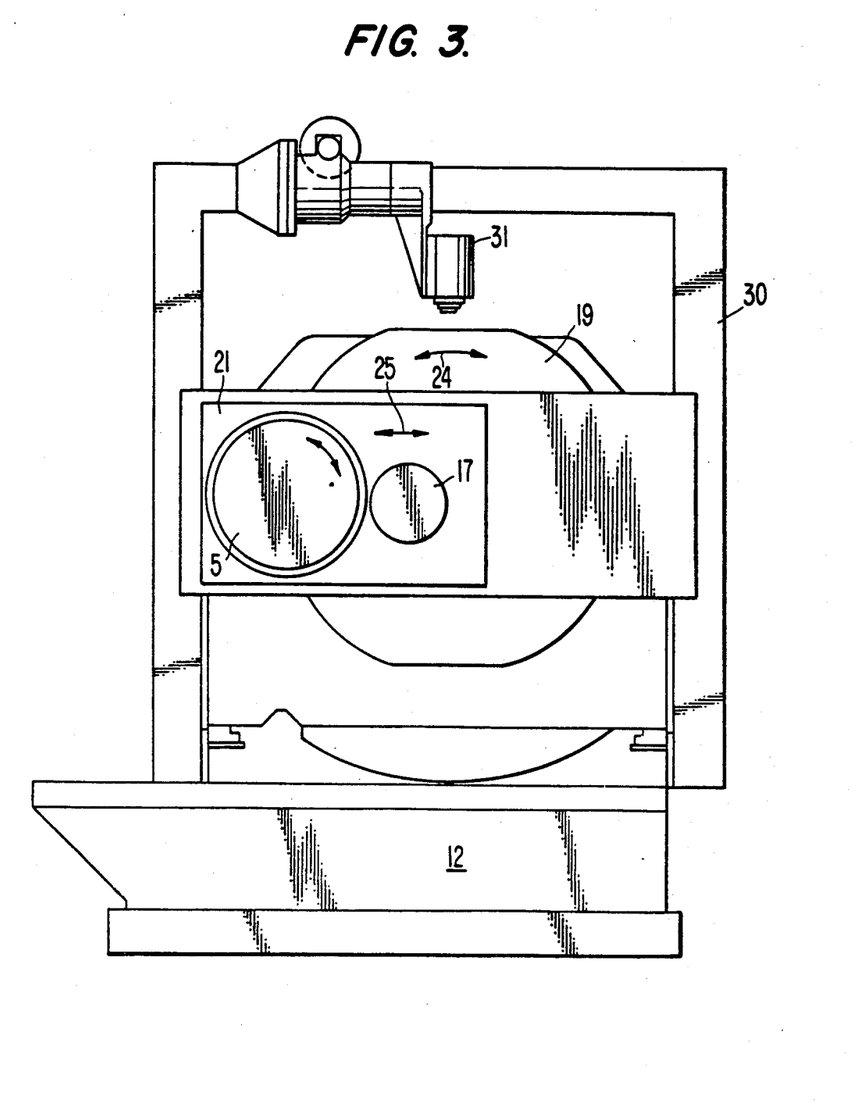
FIG. 3 is a partial front view of the grinding machine of FIG. 2.

As shown in FIGS. 2, 3, the numerical controlled grinding machine of the present invention includes a stationary machine bed 12, a workpiece carriage 13 with a workpiece carrier 14 which is adjustable relative to the stationary machine bed 12 in the directions of the arrows X, Y, and a workpiece spindle 15 for receiving a workpiece holder 37.

A tool carrier 16 is arranged on the stationary machine bed 12 in opposition to the workpiece carrier 14, with the tool carrier 16 also being adjustable relative to the stationary machine bed 12 in the directions of the arrows X, Y. The grinding machine further includes a drive motor 17, a roller 19, and a carriage guide 20 for the tool carrier 16, with a grinding carriage 21 being driven by the motor 17. The grinding wheel 5 executes a working motion in the direction of the arrow 22, with the arrows 23, 24 indicating hobbing movements, and the arrow 25 indicating the eccentricity adjustment of the grinding head. A truing tool 26 is adapted to be displaced in the direction of the arrow 27, with the truing tool 26 being pivotable about a horizontal axis in a direction of the arrow 28. A drive motor 29 is provided for pivoting the truing tool 26 in the directions of the arrow 28. A support frame 30 fixedly connects the truing device to the stationary machine bed 12, and a motor 31, for driving the truing device 26, is arranged in a housing mounted on the support frame 30.

The arrow 25 represents radial movement of the carriage guide 20 and the grinding wheel 5 to allow grinding of one tooth flank in a forward hobbing motion and the other tooth flank in a rearward hobbing motion. The arrows 23 and 24 represent compensating movement resulting in forward and rearward hobbing motions.

The grinding machine of FIGS. 2 and 3 first allows the generation of the circularly tooth bevel gear in a hobbing process. The workpiece, namely, a pregeared bevel gear (not shown in FIGS. 2 and 3), is secured in the workpiece holder 37, whereas grinding wheel 5 is mounted to the roller 19 of the tool carrier. The grinding wheel 5 and the workpiece execute a hobbing motion by which a tooth form in the direction of tooth depth is generated. The hobbing motion and all secondary movements are numerically controlled so that a mechanical transmission train is not required. The balancing or compensating rotation "f" shown in FIG. 1 and the displacement over the distance "e" can be effected with a higher accuracy and in less time between the shifting from the forward to the rearward hobbing motions.

The truing tool 26 includes an arm 32 connected to the drive motor 29 for pivoting the arm 32, in the directions of the arrow 28, with the arm 32 being lockable in any desired pivoted position. Upon changing the pivot angle of the arm 39, the angle of meshing or gearing of the grinding wheel 5 may be corrected. Since the motor 31 driving the truing tool 26 is selected for the grinding wheel 5, any combination of rotational speed of the grinding wheel 5 and rotational speed of the truing tool 26 is possible. The grinding wheel 5 is moved toward the truing tool 26 formed, for example, as a truing roller, through "e" displacement so that a radius of the grinding wheel 5 is determined, and the grinding wheel 5 is also moved for an inner truing to another side of the truing tool 26. The depth feed is carried out by moving the grinding wheel 5 rearwardly away from the truing tool 26 so that the "e" displacement can be enhanced when the grinding wheel 5 is retracted for the truing operation and is then again moved forward. Upon the coordination of the depth infeed and "e" displacement, the front edge of the grinding wheel 5 is provided with a contour corresponding to that of the front edge of the truing tool 26, for example, a diamond truing roller 26, so that the tooth base of the bevel gear being ground is attained.

If desired, the pivoting movement of the truing tool 26 and the depth infeed can be carried out in the numerically controlled grinding machine so that the tooth contour will be generated with a greater accuracy, quickly and without any problem.

Figure 4:
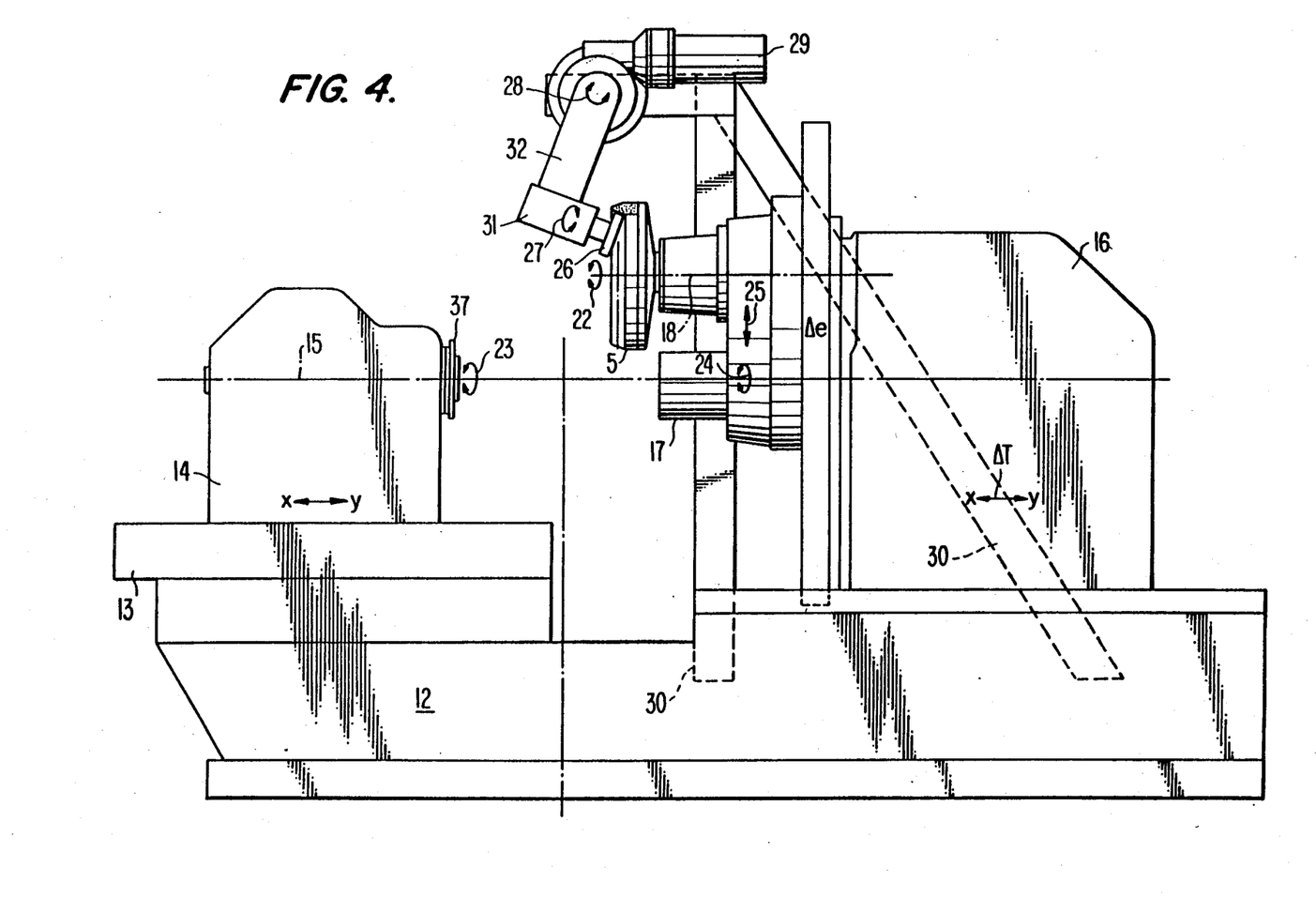
FIG. 4 is a schematic side view of another embodiment of a grinding machine according to the present invention.
Figure 5:
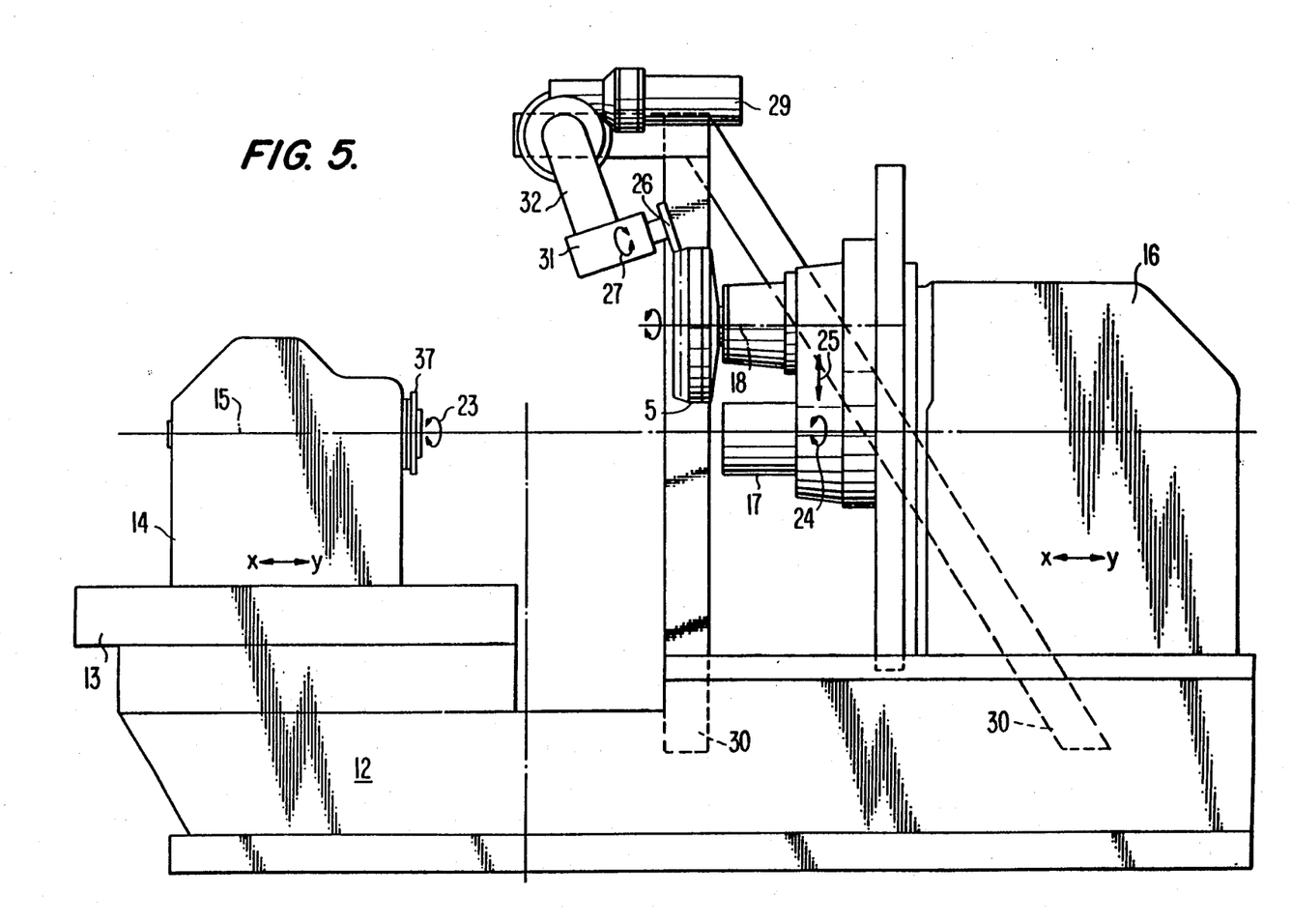
FIG. 5 is a schematic side view of yet another embodiment of a grinding machine with another arrangement of a truing tool.
Figure 6:
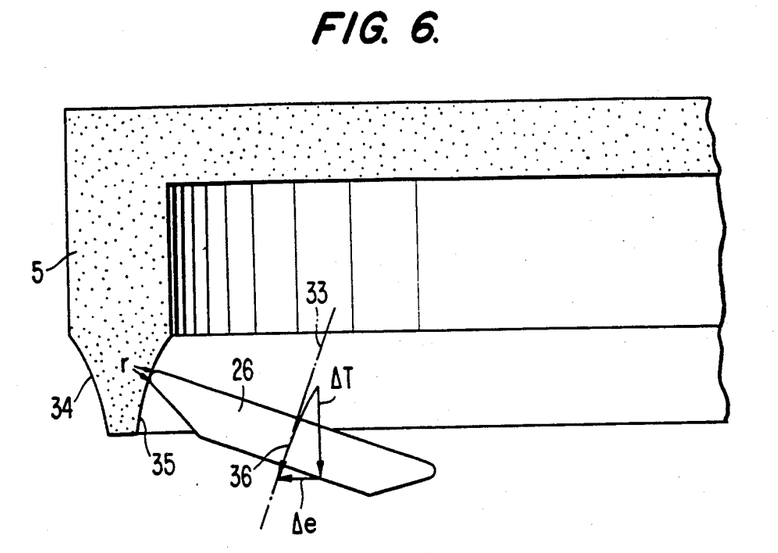
FIG. 6 is a view illustrating a truing of a Corund grinding wheel with the aid of a diamond truing roller.

Due to the arrangement of the machine axes and the truing tool 26 outside the grinding carriage 21 and stationarily by the rigid connected of the support frame 30 to the stationary machine bed 12, a further possibility of the truing of the grinding wheel 5 can be seen from FIGS. 4 to 7. This possibility occurs when a known cup-shaped grinding wheel is employed in place of the hollow conical grinding wheel, with the machine control being possible with the cup-shaped grinding wheel. As shown in FIGS. 4 and 5, the truing tool 26 does not have a contour with a high bulging but may, in an extreme case, be a single diamond (not shown). Since a single diamond is always subject to very strong wear, the truing tool 26 covered with a diamond coating is utilized as shown in FIG. 6. A center axis 33 of the truing tool 256 can extend parallel to the angular edge of grinding wheel 5, with the angle of inclination of the truing tool 26 depending upon given conditions of the operation.

FIG. 4 illustrates the truing process of profiling the inner cone of the grinding wheel 5 illustrated, whereas, a positioning of the truing tool or roller 26 for profiling the outer cone of the grinding wheel 5 is shown in FIG. 5.

In a simple case, the profile of the grinding wheel without high bulging or cambering is generated by a linear superposition of the depth infeed $\Delta T$ of the tool carrier 16 and the eccentricity adjustment $\Delta e$ of the carriage 21 as shown in FIG. 6. The truing tool 26, formed as a diamond roller has a radius "r", whereas the grinding wheel 5 has side edges 34, 35 having a high bulging or cambering. The reference numeral 36 identifies a truing stroke and the thick lines represent the diamond coating.

According to the method of the present invention, the diamond roller 26 with straight line flanks can profile a Corund wheel or a Borazon wheel with the aid of a silicon carbide grinding disc, which is polished during the truing operation and must be respectively followed up. The truing operation of Borazon is possible inside the grinding machine for grinding bevel gears. If the profiling takes place with a diamond roller or a grinding disc, it is expedient to pivot the truing tool 26 with the aid of the pivoting device in accordance with an engagement angle difference between the inner cone 35 and the outer cone 34 of the grinding wheel during the truing of the inner and outer cones. The truing tool 26 can be also stationary when, for example, the axis of truing roller 26 extends parallel to the axis 18 of the grinding wheel and then a respective correction via the numerical machine control should be carried out.

If the grinding wheel 5 is profiled with a single diamond or with the diamond truing roller so that the high bulging can be produced on the side edges 34, 35 of the grinding wheel 5 and a linear coordination of the depth $\Delta T$ and the carriage adjustment $\Delta e$ is produced and a bulging or cambering of the edges 34, 35 is so superposed that the central point of the radius of the diamond truing tool 26 or the cutting edge of the single diamond execute a curved motion in such a form that a predetermined desired bulging or cambering is generated on the side edges 34, 35 of the grinding wheel 5.

Figure 7:
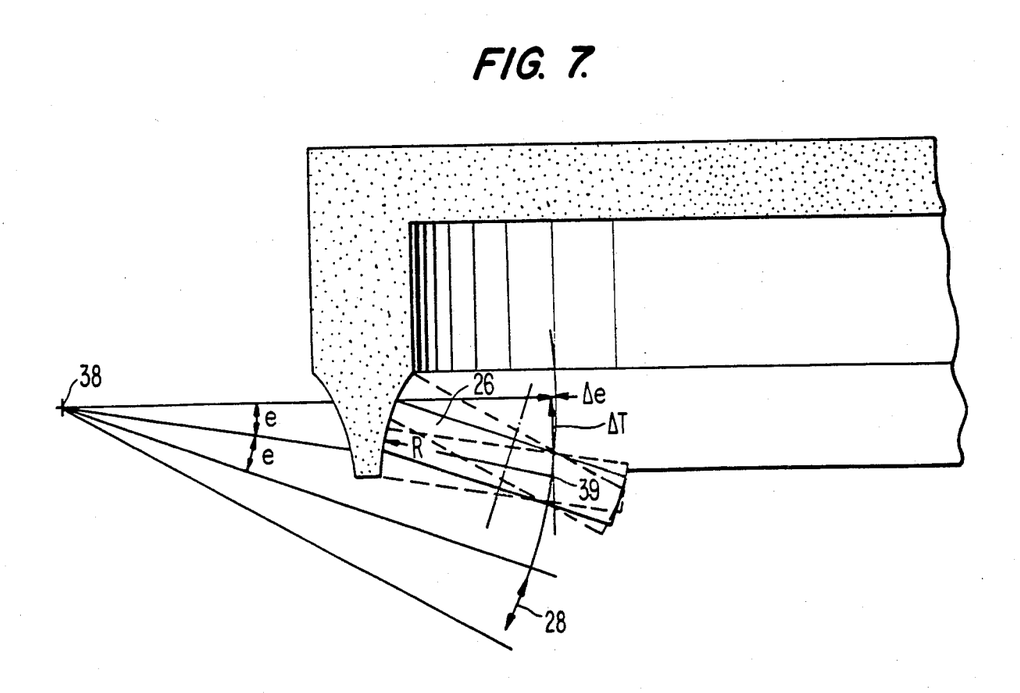
FIG. 7 is a view showing a truing of a Borazon grinding wheel by a silicon carbide grinding disc.

During a truing of the Borazon grinding wheel with the aid of the silicon carbide grinding disc, a motion, as shown in FIG. 7, is possible. The truing tool 26, i.e., a wheel or disc is pivoted about a pivot point 39 whereby the radius of the pivoting movement is reduced. Truing radii R from 200 to 3,000 mm are desired on the grinding wheel 5 according to a module and desired cambering. Radius R is variable depending upon the task of truing. Therefore, the pivot point 39 of the truing tool 26 can not lie below the pivot point of the truing motion. Furthermore, such a device can be hardly employed within the machine for collision reasons. This motion, however, can be generated by the use of the pivoting device of FIG. 4 and the use of this device in the grinding machine produces controlled motions $\Delta T$ and $\Delta e$. The truing tool 26 is pivoted about the pivot axis 38 about angles 1 in the directions of the arrow 28. Thereby, a position of the pivot point 38 of the truing motion relative to the grinding wheel 5 remains the same if the tool carrier is moved backward a distance $\Delta T$ and the carriage 21 will follow this movement the distance $\Delta e$. Thus, the pivot point 39 of the truing motion will remain in the same position relative to the grinding wheel 5, and the truing tool 26, due to superposing of these three motions, will make a pivoting motion relative to the grinding wheel 5 thereby producing a cambering or bulging radius R. Due to the oscillation of the truing tool 26 about the pivot point 39 relative to the grinding wheel 5, a desired bulging is also produced on the Borazon grinding wheel 5. Wear of the truing disc 26 as well as all other above described motions can be controlled in the machine control with high precision.

While I have shown and described several embodiments in accordance with the present invention, it is understood that the same is not limited thereto but is susceptible to numerous changes and modifications as known to one having ordinary skill in the art and I therefore do not wish to be limited to the details shown and described herein, but intend to cover all such modifications as are encompassed by the scope of the appended claims.

I claim:

1. A method of grinding pregeared bevel gears in a hobbing motion of a bevel gear and a grinding tool in a grinding machine including a truing device, the method comprising the steps of:

grinding at a gap of each tooth a right-hand flank and a left-hand flank in a single setting by a single grinding tool, by first grinding one flank of a tooth gap in a forward hobbing motion, then grinding another flank in the same tooth gap in a rearward hobbing motion by imparting first to said grinding tool in a radial movement over a predetermined distance and then a compensating movement in a direction perpendicular to that of the radial movement, said compensating movement being a rotational movement of the grinding tool, such that a center point of a grinding radius of said grinding tool is shifted;

numerically controlling said radial movement and said compensating movement in the grinding machine;

continually changing an adjustment of said grinding machine, by changing said predetermined distance between the grinding of the right-hand flank and the left-hand flank so as to enable grinding of another side of the flank; and changing the engagement between said grinding tool and a gear being treated from said one flank to said another flank.

2. The method as defined in claim 1, wherein said grinding tool is a grinding wheel, and wherein the grinding wheel is moved toward the truing device to determine a radius of the grinding wheel.

3. The method as defined in claim 2, wherein the truing device is pivotable, and wherein an angle of engagement of the truing device with said grinding wheel is adjusted by a pivotal movement of said truing device.

4. The method as defined in claim 3, wherein the pivoting movement and a depth infeed of the truing device are numerically controlled for generating a correct tooth contour.

5. The method as defined in claim 2, wherein said grinding wheel includes a cutting front edge having a contour adjustable by a respective coordination between a depth infeed of the truing device and said radial movement of the grinding wheel.

6. The method as defined in claim 2, wherein a numerical control of the truing device and the grinding wheel is carried out according to wear.

7. A method of grinding pregeared bevel gears in a hobbing motion of a bevel gear and a grinding wheel in a grinding machine including a truing device, the method comprising the steps of:

grinding at a gap of each tooth a right-hand flank and a left-hand flank in said tooth gap in a single setting by a single grinding tool;

continually changing an adjustment of the grinding tool, by first grinding one flank of said tooth gap in a forward hobbing motion, then grinding another flank in the same tooth gap in a rearward hobbing motion by imparting first to said grinding tool a radial movement and then a compensating movement in a direction perpendicular to that of the radial movement, said compensating movement being a rotational movement of the grinding tool, such that a center point of a grinding radius is shifted;

numerically controlling said radial movement and said compensating movement in the grinding machine;

continually changing an adjustment of the grinding machine; and moving the grinding tool toward the truing device to determine a radius of the grinding tool.

* * * * *